(12) United States Patent
Shellef

(10) Patent No.: US 12,467,380 B1
(45) Date of Patent: Nov. 11, 2025

(54) SYSTEM AND PROCESS FOR EXTRACTING ENERGY FROM HEAT

(71) Applicant: SHELLEF HOLDINGS INC., Kingston, NY (US)

(72) Inventor: Dov Shellef, Kingston, NY (US)

(73) Assignee: Shellef Holdings Inc., Kingston, NY (US)

( * ) Notice: Subject to any disclaimer, the term of this patent is extended or adjusted under 35 U.S.C. 154(b) by 0 days.

(21) Appl. No.: 19/063,623

(22) Filed: Feb. 26, 2025

(51) Int. Cl.
| F01D 15/10 | (2006.01) |
| F01D 5/02 | (2006.01) |
| F03G 4/00 | (2006.01) |

(52) U.S. Cl.
CPC ............... F01D 15/10 (2013.01); F01D 5/02 (2013.01); F03G 4/033 (2021.08)

(58) Field of Classification Search
CPC ............. F01D 15/10; F01D 5/02; F03G 4/033
USPC ..................................... 290/43, 54
See application file for complete search history.

(56) References Cited

U.S. PATENT DOCUMENTS

| 10,400,634 | B2 | 9/2019 | Öström et al. |
| 11,530,644 | B1 | 12/2022 | Kemmerer |
| 11,927,117 | B2 | 3/2024 | Rotschild et al. |
| 12,326,095 | B2 * | 6/2025 | Cangioli .............. F01D 15/10 |
| 2007/0007771 | A1 * | 1/2007 | Biddle .................. B01D 53/002 290/7 |
| 2007/0193271 | A1 | 8/2007 | Gorban |
| 2009/0232729 | A1 | 9/2009 | Genkin et al. |
| 2010/0122990 | A1 | 5/2010 | Carapelli |
| 2016/0209082 | A1 | 7/2016 | Yang |
| 2017/0198583 | A1 | 7/2017 | Dean |
| 2019/0120088 | A1 | 4/2019 | Öström et al. |
| 2020/0263568 | A1 | 8/2020 | Copeland et al. |
| 2021/0246869 | A1 | 8/2021 | Suzuki |
| 2022/0205370 | A1 | 6/2022 | Blnl et al. |
| 2023/0102894 | A1 | 3/2023 | Noble |
| 2023/0175417 | A1 | 6/2023 | Schlegel |

FOREIGN PATENT DOCUMENTS

GB           2162583 A       2/1986

OTHER PUBLICATIONS

Guan, Z., et al. "Efficient underwater energy harvesting from bubble-driven pipe flow," Applied Energy. vol. 295, Aug. 1, 2021, 116987, 3 pages.

(Continued)

*Primary Examiner* — Charles Reid, Jr.
(74) *Attorney, Agent, or Firm* — Stites & Harbison, PLLC

(57) ABSTRACT

A system includes a turbine; a first fluid; and a second fluid, wherein the turbine is composed of a rotor assembly having at least one first rotor and at least one second rotor affixed to a shaft and within an enclosure configured to contain the first and second fluids, wherein the energy in a mixture of first and second fluids provided to the at least one second rotor results from vaporization and expansion of the second fluid. A continuous process for converting heat to kinetic energy utilizes the system and includes: mixing the second fluid with the first fluid; vaporization of the second fluid by heat transfer from the first fluid to form a pressurized mixture; and contacting the at least one second rotor with the pressurized mixture to impart rotational motion to the rotor assembly.

27 Claims, 6 Drawing Sheets

(56) References Cited

OTHER PUBLICATIONS

International Search Report of the ISA/US mailed Jun. 26, 2024 for International Application No. PCT/US2024/020770 filed Mar. 20, 2024, 3 pages.
Organic Rankine Cycle—ORC. News. Ormat. 2019. Retrieved from the Internet at https://www.ormat.com/en/company/news/view/?ContentID-8819 on Apr. 16, 2024, 4 pages.
Waste Heat to Power Systems. EPA CHP Combined Heat and Power Partnership. U.S. Environmental Protection Agency, Apr. 2022. Retrieved from the Internet Apr. 16, 2024 at https://www.epa.gov/sites/default/files/2015-07/documents/waste_heat_to_power_systems.pdf , 9 pages.
Written Opinion of the ISA/US mailed Jun. 26, 2024 for International Application No. 20, 2024, 6 pages.

\* cited by examiner

SYSTEM AND PROCESS FOR EXTRACTING ENERGY FROM HEAT

CROSS-REFERENCE TO RELATED APPLICATIONS

This non-provisional patent application is a Continuation of U.S. Non-provisional Application No. 18,701,833, filed Apr. 16, 2024, which is a National Stage application of PCT/US2024/020770, filed Mar. 20, 2024, which claims the benefit of U.S. Provisional Application No. 63/453,157 filed Mar. 20, 2023, all of which are incorporated herein by reference in their entirety.

BACKGROUND

This disclosure relates to power-engineering and in particular to a system for salvaging wasted energy by transforming heat into useful mechanical or electrical work. A turbine is a rotary mechanical device that extracts energy from a fluid flow and converts it into useful mechanical work. The work produced can be used for generating electrical power by means of a generator. A turbine is a turbomachine with at least one moving part called a rotor assembly, which is a shaft or drum with blades attached. Moving fluid acts on the blades so that they move and impart rotational energy to the rotor. Early examples are turbines are windmills and waterwheels. Water, steam, and gas turbines have a casing around the blades that contains and controls the working fluid.

The quest for conversion of energy to power propelled the invention of engines and power plants, from the early days of steam engines to the jet engine era. These engines can be categorized by the source of energy they use, their mechanics, and their work output. The first engines were steam engines, and relied on an outside source of energy to boil water to produce steam. The process employed in steam engines is a cyclical (batch) process, in which the steam does work on a moveable piston encased in a cylinder. Next came the internal combustion engine, which evolved to have internal heat production. However, an internal combustion engine still operates in a cyclical process. The cyclical steam engine later evolved into a steam turbine which operates in a continuous process. The same happened to the internal combustion engine, which operates in a cyclical process. It evolved into the turbojet engine, which operates by a continuous process. All of these engines can be utilized to generate electricity. All of these engines have also been mounted on frames with wheels or wings in various ways to create a multitude of moving machines.

Water wheels designed for doing useful work or generation of electricity have evolved into water turbines. Conversion of energy from liquid water using water turbines is much more efficient and lower in cost than the conversion of energy from a fluid in the form of steam or a gases.

A working fluid contains potential energy (pressure head) and kinetic energy (velocity head). The fluid may be compressible or incompressible. Several physical principles are employed in turbines to collect this energy, for example impulse turbines and reaction turbines. Impulse turbines change the direction of flow of a high velocity fluid or gas jet. The resulting impulse spins the turbine and leaves the fluid flow with diminished kinetic energy. There is no pressure change of the fluid or gas in the turbine blades (the moving blades), as in the case of a steam or gas turbine. Instead, all the pressure drop takes place in the stationary blades (the nozzles). Before reaching the turbine, the pressure head of the fluid is changed to velocity head by accelerating the fluid with a nozzle. Pelton wheels and de Laval turbines use this process exclusively. Impulse turbines do not require a pressure casement around the rotor since the fluid jet is created by the nozzle prior to reaching the blades on the rotor. Newton's second law describes the transfer of energy for impulse turbines. Impulse turbines are most efficient for use when fluid flow is low and the inlet pressure is high.

Reaction turbines develop torque by reacting to gas or fluid pressure or mass. The pressure of the gas or fluid changes as it passes through the turbine rotor blades. A pressure casement is needed to contain the working fluid as it acts on the turbine stage(s) or the turbine must be fully immersed in the fluid flow (such as with wind turbines). The casing contains and directs the working fluid and, for water turbines, maintains the suction imparted by the draft tube. Francis turbines and most steam turbines use this concept. For compressible working fluids, multiple turbine stages are usually used to harness the expanding gas efficiently. Newton's third law describes the transfer of energy for reaction turbines. Reaction turbines are better suited to higher flow velocities or applications where the fluid head (upstream pressure) is low.

A gas turbine, also called a combustion turbine, is a type of continuous flow internal combustion engine. The main parts common to all gas turbine engines form the power-producing part (known as the gas generator or core) and are, in the direction of flow: a rotating gas compressor, a combustor, and a compressor-driving turbine. An additional turbine—a power turbine—is required to drive an electrical generator. The basic operation of the gas turbine is a Brayton cycle with air as the working fluid: atmospheric air flows through the compressor that brings it to higher pressure; energy is then added by spraying fuel into the air and igniting it so that the combustion generates a high-temperature flow; this high-temperature pressurized gas enters a turbine, producing a shaft work output in the process, used to drive the compressor; the unused energy comes out in the exhaust gases that can be repurposed for external work, such as directly producing thrust in a turbojet engine, or rotating a second, independent turbine (known as power turbine) that can be connected to a fan, propeller, or electrical generator. The purpose of the gas turbine determines the design so that the most desirable split of energy between the thrust and the shaft work is achieved. The fourth step of the Brayton cycle (cooling of the working fluid) is omitted, as gas turbines are open systems that do not reuse the same air.

Gas turbines are utilized in system known as the Rankine cycle. The Rankine cycle generates power by passing water through an evaporator, creating steam. The steam drives a gas turbine, which in turn generates electricity. The vapor (steam) is then condensed and recycled through the evaporator. Many different configurations have been designed to increase the efficiency of the Rankine cycle, e.g. through the use of preheaters and pressure differentials. Efficiency can also be boosted through the use of cascade systems, with one or more additional gas turbines. In a two-level cascade system, one gas turbine operates at low temperature and pressure and another gas turbine operates at high temperature and pressure. This method is an effective form of power generation in scenarios where sufficient quantities of thermal energy are available to boil water and create a large pressure differential. These processes are generally only feasible at large scales due to the complexity of gas turbines.

A Rankine cycle system is illustrated in FIG. 1. Evaporator 10 creates steam vapor by boiling water. The steam flows downstream to a gas turbine 12 to generate electricity. The steam then flows downstream into a condenser 14, where it is liquified back to water. Finally, the condensed water is fed by a liquid pump 16 back into the evaporator 10, and the cycle carries on in a continuous loop.

A variation of the Rankine cycle, known as the organic Rankine cycle (ORC), uses organic fluids such as butane (boiling point of −1 to +1° C.) or propane (boiling point −42° C.) as the fluid that is evaporated. This is effective, because these fluids have much lower boiling points than water, allowing for vapor to be produced at a much lower temperature. This allows for them to be used in a wide array of applications, where thermal energy is available, but at a lower temperature. In these systems, however, the available temperature differential is not great enough to generate a large enough pressure differential for efficient conversion to kinetic energy. The organic Rankine cycle has the same drawbacks as a steam-based Rankine cycle as relates to efficiency and capital cost. The most efficient ORC systems can only achieve a maximum efficiency of 4-6% at temperatures below 100° C. (Kosmadakis et al., 'Experimental testing of a low-temperature organic Rankine cycle (ORC) engine coupled with concentrating PV/thermal collectors: Laboratory and field tests. *Energy*, Elsevier, 2016, 117, pp. 222-236.

It is desirable to have a system which works with lower temperature source fluids, such as the organic Rankine cycle, but also has the lower complexity and efficiency of water turbines. In particular, a turbine which is vapor-powered, but liquid-driven, was a research and development goal. In the past, extensive research and development have been directed to improving various engines for transforming heat into useful mechanical or electrical work, and in particular to improving the efficiency of water turbines and gas (combustion) turbines. With the growing danger of global warming, which is caused by emission of carbon dioxide by the combustion of fossil fuels, the continued use of gas turbines, which relies on combustion of fossil fuels, is not sustainable in the long run. As mentioned above, water wheels have evolved into water turbines for the generation of power and electricity. Energy conversion using water turbines is much more efficient and lower in cost than energy conversion using steam or gas turbines. Water turbines require a high pressure head and the associated high flow of water due to the pressure head, as is seen for example at waterfalls and river dams. However, this requires that the water turbines and power generation plant be located at a waterfall or river dam. There remains a need in the art for improved systems for conversion of energy into power and electricity. Due to the growing dangers of global warming, conversion of energy into power and electricity should not rely on the combustion of fossil fuels as in internal combustion engines and gas turbines. It is also desirable that conversion of energy into power and electricity by a stationery power plant not be limited to locations with direct access to waterfalls or dams. Existing power plants that convert heat energy to power or electricity rely on combustion of fossil fuels like coal or oil or on nuclear fission to provide heat to produce steam for operation of steam turbines. Due to inherent inefficiencies in the operation of steam turbines, these power plants produce effluents of warm water in which the heat of the water is not completely captured and converted into mechanical and electrical energy. A system for capturing this otherwise wasted heat and further conversion of the waste heat into mechanical and electrical energy in a turbine that is vapor-powered but liquid-driven is a highly desirable goal, from both environmental and energy efficiency points of view, and would provide an invaluable contribution toward the goal of environmentally friendly power generation.

SUMMARY

A system, which can be used for converting heat to kinetic energy, comprises: a turbine; a first fluid; and a second fluid, wherein the turbine comprises
  a. a rotor assembly comprising at least one first rotor and at least one second rotor affixed to a shaft and within an enclosure configured to contain the first fluid and the second fluid, wherein the at least one second rotor is positioned on the shaft downstream of the at least one first rotor, the at least one first rotor is configured to draw the first fluid into the turbine, the at least one second rotor is configured to extract energy from a mixture of the first fluid and the second fluid by contacting the mixture and providing rotational energy to the rotor assembly, and the at least one first rotor and at least one second rotor are also configured to mix the second fluid with the first fluid to form the mixture,
  b. a first fluid inlet positioned upstream of the at least one first rotor,
  c. a second fluid inlet positioned between the at least one first rotor and the at least one second rotor and configured to direct the second fluid into the turbine,
  d. a fluid outlet positioned downstream of the at least one second rotor, and
  e. a gas outlet positioned downstream of the at least one second rotor,
  wherein the energy in the mixture provided to the at least one second rotor results from vaporization and expansion of the second fluid resulting in pressurization of the mixture.

A continuous process for converting heat to kinetic energy utilizing the system, wherein the heat is extracted from the first fluid and converted to rotational motion, comprises the following simultaneous steps:
  a. drawing the first fluid into the turbine through the first fluid inlet and imparting flow downstream of the first fluid by rotation of the at least one first rotor;
  b. pumping a second fluid into the second fluid inlet;
  c. mixing the second fluid with the first fluid to form a mixture of first fluid and second fluid;
  d. vaporization of the second fluid by heat transfer from the first fluid to form a pressurized mixture; and
  e. contacting the at least one second rotor with the pressurized mixture to impart rotational motion to the rotor assembly by means of mixture flow through the at least one second rotor.

BRIEF DESCRIPTION OF THE DRAWINGS

The above and other advantages and features of this disclosure will become more apparent by describing in further detail embodiments thereof with reference to the accompanying drawings, wherein the like elements are numbered alike, in which.

DETAILED DESCRIPTION

Figure 1:
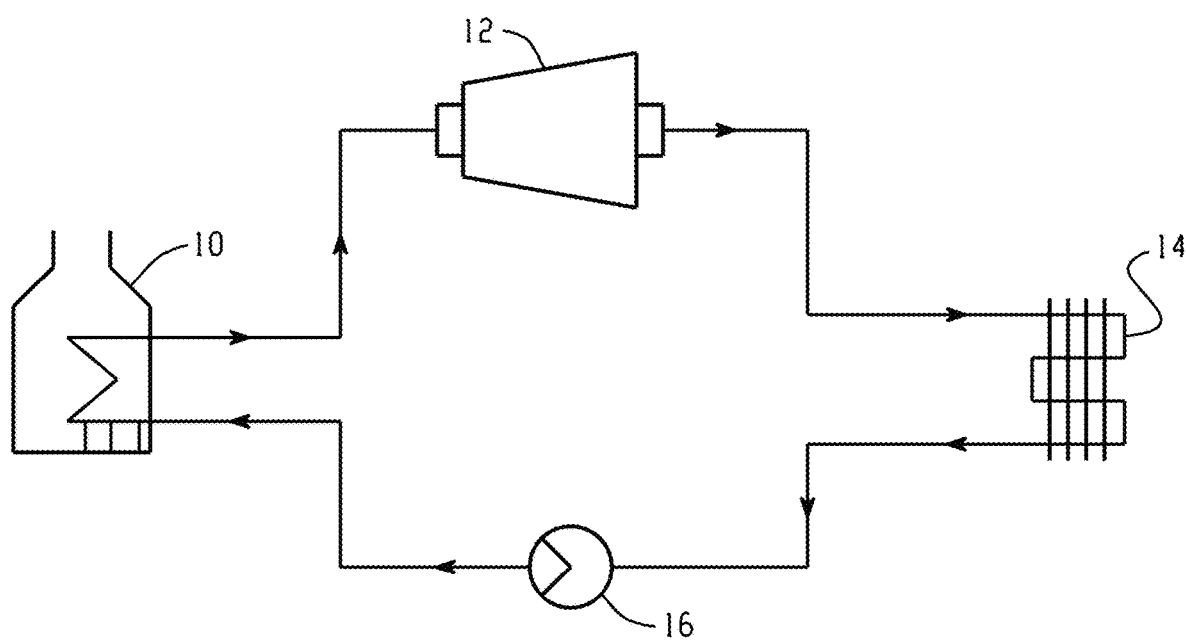
FIG. 1 is a schematic diagram of a Rankine cycle system.

It has unexpectedly been found by the present inventor that waste heat from various industrial processes can be captured to generate power or electricity using the system described herein. The present system operates according to a modified Organic Rankine Cycle (ORC). Advantageously, the system does not rely on combustion of fossil fuels such as oil, natural gas, or coal, for heat generation. Therefore it does not contribute carbon dioxide and therefore does not contribute to global warming. Unlike hydroelectric systems, the present system does not need to be situated near a waterfall or dam to operate. It is a further advantage that the system can convert waste heat from water effluent of other power generation system into electricity, further increasing the overall efficiency of these power generation systems. Moreover, high temperatures are not required. The temperature of the waste effluent only needs to be slightly higher than ambient temperature.

A liquid as defined herein is a nearly incompressible fluid that conforms to the shape of its container but retains a nearly constant volume independent of pressure.

A fluid as defined herein is a liquid, gas, supercritical fluid or other material that continuously deforms (flows) under an applied shear stress, or external force.

A system, which can be used for converting heat to kinetic energy, comprises: a turbine; a first fluid; and a second fluid, wherein the turbine comprises
 a. a rotor assembly comprising at least one first rotor and at least one second rotor affixed to a shaft and within an enclosure configured to contain the first fluid and the second fluid, wherein the at least one second rotor is positioned on the shaft downstream of the at least one first rotor, the at least one first rotor is configured to draw the first fluid into the turbine, the at least one second rotor is configured to extract energy from a mixture of the first fluid and the second fluid by contacting the mixture and providing rotational energy to the rotor assembly, and the at least one first rotor and at least one second rotor are also configured to mix the second fluid with the first fluid to form the mixture,
 b. a first fluid inlet positioned upstream of the at least one first rotor,
 c. a second fluid inlet positioned between the at least one first rotor and the at least one second rotor and configured to direct the second fluid into the turbine,
 d. a fluid outlet positioned downstream of the at least one second rotor, and
 e. a gas outlet positioned downstream of the at least one second rotor,
 wherein the energy in the mixture provided to the at least one second rotor results from vaporization and expansion of the second fluid resulting in pressurization of the mixture.

In some embodiments of the system, the rotor assembly is vertically orientated. In other embodiments of the system, the rotor assembly is horizontally orientated.

In some embodiments, the system further comprises a condenser configured to condense vapor of the second fluid downstream of the turbine and recycling the condensed second fluid.

In some embodiments of the system, the rotor assembly further comprises at least one third rotor configured to oppose the flow of the mixture and to compress a second fluid vapor phase of the mixture, wherein the at least one third rotor is positioned between the at least one first rotor and the at least one second rotor. The at least one third rotor can have the opposite directionality of the at least one first and second rotors.

In some embodiments of the system, the gas outlet is positioned after the fluid outlet in the direction of fluid flow.

The at least one first rotor can comprise 1 to 500 first rotors, the at least one second rotor can comprise 1 to 500 second rotors, and the at least one third rotor, when present, can comprise 1 to 500 third rotors.

The at least one first rotor, at least one second, and at least one third rotors, when present, can be each independently at least one of an axial rotor, a radial rotor, a screw rotor, a Francis rotor, or a Kaplan rotor.

In some embodiments of the system, the first fluid is a heat transfer fluid. The first fluid can be, for example, at least one of water, ethylene glycol, ethylene glycol-water mixtures, propylene glycol, propylene glycol-water mixtures, a paraffin oil, a mineral oil, hydrogenated mineral oil, a synthetic hydrocarbon oil, an alkylated aromatic oil, a hydrogenated terphenyl, a silicone oil, a polydimethylsiloxane, a diphenylsiloxane-dimethylsiloxane copolymer, a diphenyl ether, or a polyphenylene ether.

In some embodiments of the system, the second fluid is at least one of trichlorofluoromethane, dichlorodifluoromethane, bromochlorodifluormethane, chlorotrifluoromethane, bromotrifluoromethane, triifluoroiodomethane, tetrachloromethane (carbon tetrachloride), dichlorofluoromethane, chlorodifluoromethane, trifluoromethane, dichloromethane (methylene chloride), chlorofluoromethane, difluoromethane (methylene fluoride), chloromethane (methyl chloride), fluoromethane (methyl fluoride), methane, 1,1,2-trichloro-1,2,2-trifluoroethane, 1,2-dichloro-1,1,2,2-tetrafluoromethane, chloropentafluoroethane, hexafluoroethane, 2,2-dichloro-1,1,1-trifluoroethane, 2-chloro-1,1,1,2-tetrafluoroethane, pentafluoroethane, 1,2,2,3,3-pentafluorobutane (HFC-365mfc), 1,1,1,2-tetrafluoroethane, 1,1-dichloro-1-fluoroethane, 1-chloro-1,1-difluoroethane, 1,1,1-trifluoroethane, 1,1-difluoroethane, ethane, propane, butane, pentane, 2-methylpropane (isobutane), 2-methylbutane (isopentane), octafluorocyclobutane, methoxymethane, ethoxyethane, methyl formate, methanamine (methyl amine), ethanamine (ethyl amine), trans-1,2-dichloroethene, 1,1-difluoroethylene, trans-1,2-difluoroethene, ethene (ethylene), 1-chloro-2,3,3,3-tetrafluoropropene, trans-1-chloro-3,3,3-trifluoro-1-propene, 2,3,3,3-tetrafluoro-1-propene, trans-1,3,3,3-tetrafluoro-1-propene, propene (propylene), trans-1,1,1,4,4,4-hexafluoro-2-butene, cis-1,1,1,4,4,4-hexaflouro-2-butene, trans-1,2-dichloroethene, 1,1,2,2-tetrafluoroethyl 2,2,2-trifluoroethyl ether (HFE-347pfc), trans-1-chloro-3,3,3-trifluoropropene (HFO-1233zd), hydrogen, helium, ammonia, neon, nitrogen, oxygen, argon, carbon dioxide, nitrous oxide, or sulfur dioxide.

The second fluid can be, for example, trans-1,2-dichloroethene, 1,1,2,2-tetrafluoroethyl 2,2,2-trifluoroethyl ether (HFE-347pfc), trans-1-chloro-3,3,3-trifluoropropene (HFO-1233zd), or carbon dioxide.

A power generation system comprises the system described herein and an electrical power generator driven by the turbine.

A continuous process for converting heat to kinetic energy utilizing the system described herein, wherein the heat is extracted from the first fluid and converted to rotational motion, comprises the following simultaneous steps:
 a. drawing the first fluid into the turbine through the first fluid inlet and imparting flow downstream of the first fluid by rotation of the at least one first rotor;
 b. pumping a second fluid into the second fluid inlet;
 c. mixing the second fluid with the first fluid to form a mixture of first fluid and second fluid;
 d. vaporization of the second fluid by heat transfer from the first fluid to form a pressurized mixture; and e. contacting the at least one second rotor with the pressurized mixture to impart rotational motion to the rotor assembly by means of mixture flow through the at least one second rotor.

In some embodiments of the process and of the system, the first fluid is water having a temperature of 30° C. to 100° C. In some embodiments of the process, the second fluid has a boiling point of −20° C. to 60° C. In some embodiments of the process, the first fluid is water, and the second fluid has a boiling point of −20° C. to 40° C. The first fluid and second fluid can be miscible or immiscible with each other. The first fluid and second fluid of the mixture can both be in the liquid phase. Alternatively, the first fluid of the mixture is in the liquid phase and the second fluid of the mixture is in the vapor phase. In some embodiments of the process, the first fluid is water, and the second fluid is an immiscible organic liquid having a boiling point of −20° C. to 40° C. The immiscible organic liquid can be a halogenated organic liquid having a boiling point of −20° C. to 40° C., for example 1,2,2,3,3-pentafluorobutane (HFC-365mfc).

The mixture can exit the turbine as a liquid solution of the first fluid and the second fluid, or as the first fluid in liquid from with entrained second fluid vapor. In some embodiments, the mixture exits the turbine as the first fluid in liquid from with entrained second fluid vapor.

In some embodiments, mixing of the first fluid and the second fluid occurs between the at least one first rotor and the at least one second rotor.

In some embodiments, the rotor assembly further comprises at least one third rotor configured to oppose the flow of the mixture and to compress a second fluid vapor phase of the mixture, wherein the at least one third rotor is positioned between the at least one first rotor and the at least one second rotor. The least one third rotor can have the opposite directionality of the at least one first and second rotors.

In some embodiments of the process, the first fluid in the turbine upstream of the at least one first rotor is at a first temperature $T_1$ and first pressure $P_1$; the mixture in the turbine downstream of the at least one first rotor and upstream of the at least one second rotor is at a second temperature $T_2$ and second pressure $P_2$; and the mixture in the turbine upstream of the at least one second rotor is at a third temperature $T_3$ and third pressure $P_3$, wherein $T_1$ is 40 to 500° C.; $T_2$ is 40 to 400° C.; $T_3$ is 20 to 100° C.; $P_1$ is 0 to 10 atm; $P_2$ is 1 to 40 atm; and $P_3$ is 0 to 3 atm. In some embodiments of the process, $T_1$ is greater than $T_2$, which is greater than $T_3$; and $P_2$ is greater than $P_3$, which is greater than or equal to $P_1$.

These embodiments are now described in more detail. In the present system comprising a turbine, a first fluid, and a second fluid and continuous process for converting heat to kinetic energy, two laws of physics apply. One governs the harnessing of energy from a waterfall where the weight (mass) of water times the height (head) is energy. The potential energy at the top of the waterfall is turned into kinetic energy that moves the turbine (water turbine). The second one is quite similar in that pressure (not just head of water) is energy and that gas at high pressure is also able to create work when the pressure is released. However, when gas is released when pressure is lowered, the gas temperature decreases. For the first case (waterfall) we need a water turbine to harness the potential energy of the water, and for the second case (gas expansion) we need a gas (vapor, steam) turbine (like a jet engine) to harness the energy.

In this disclosure, the two processes are combined. The first fluid provides the energy to vaporize the second fluid and the vaporized second fluid, a mixture of liquid and gas, provides pressure. The result should be a mixture of the two fluids coming out at much lower temperature than otherwise calculated based on the blended fluids temperatures. Advantageously, a turbine that can handle a mixture of liquid and gas has been developed. The turbine is a hybrid of a water turbine and a gas turbine. and operates at a much lower rate of revolution than a gas turbine.

In some embodiments, vaporized second fluid is pressurized and compressed in the mid-section of the turbine (between the at least one first rotor and at least one second rotor). In this embodiment, the mid-section of the turbine, where the second fluid enters, should be at a higher pressure than the first fluid entering the turbine ($P_1$). In some embodiments, the pressure ($P_2$) is greater than $P_1$.

In the absence of pressurization of the mixture of first fluid and second fluid in the mid-section of the turbine, the second fluid in the gas phase can be at least 90%, 95%, 96%, 97%, 98%, or 99% of the total volume of the mixture contained by the turbine. After pressurization, the second fluid can be at least 50%, 70%, 90%, or 95% in the liquid phase. The higher the volume percentage of second fluid in the gas phase, based on the total volume of the mixture contained by the turbine, the better.

Pressurization and compression of the vaporized second fluid can be achieved with at least one third rotor configured to oppose the flow of the fluid mixture. The at least one third rotor is positioned between the at least one first rotor and the at least one second rotor. In some embodiments the third rotor has the opposite directionality of the at least one first and second rotors, in order to pressurize and compress the vaporized second fluid. When the second liquid vapor is pressurized and compressed by the at least one third rotor, the at least one third rotor is functioning as a compressor. It causes a build-up of pressure analogous to the action of winding a spring.

In the absence of pressurization and compression of the second fluid, it will vaporize and remain vaporized while the liquid (first fluid) will lose very little energy. In this scenario, the second fluid will exit the turbine at temperatures which are very close to the inlet temp of the first fluid.

In some embodiments the first fluid is hot water (polar) and the second fluid is a low-boiling organic solvent (nonpolar), because of Dalton's law of partial pressures, which teaches that blending polar and nonpolar partial pressure will build higher pressure than expected because no intermolecular attraction between polar and nonpolar molecules is expected and Dalton's Law of Partial Pressure applies. Rault's Law is also relevant.

In some embodiments, the casing of the turbine at the first and second fluid exit paths can be configured to have a pressurization and compression effect in the absence of at least one third rotor.

In some embodiments, there is no outside pump to pump the first fluid into the turbine. The rotor assembly comprises at least two parts. The first part of the rotor assembly, is the at least one first rotor, which serves as an impeller for drawing the first fluid into the turbine. In some embodiments, the at least one first rotor is a radial impeller, for example a centrifugal impeller. The second part of the rotor assembly, which is housed in the relief section of the turbine, is the at least one second rotor. The relief section of the turbine is the section from which the first fluid and second fluid exit the turbine. In some embodiments, the at least one second rotor is an axial rotor. The at least one second rotor can be a type of conical screw that starts with a small diameter to handle mostly high pressure liquid which gradually enlarges to accommodate more and more gas and less and less liquid (Lily turbine). The second part of the rotor assembly can also be replaced with a Tesla Turbine.

In some embodiments, the rotor assembly comprises at least one third rotor configured to oppose the flow of the fluid mixture and to compress a second fluid vapor phase of the fluid mixture, wherein the at least one third rotor is positioned between the at least one first rotor and the at least one second rotor. As such, the at least one third rotor can be considered a compressor. The at least one third rotor can be the mirror image of the at least one first and second rotors, i.e. it can have the opposite directionality. The at least one third rotor can also have the same directionality as the at least one first and second rotors, but the rotor blades are configured to have a different angle relative to the shaft. This angle can be selected to maximize resistance of downstream flow and to maximize compression of the second fluid in the vapor phase.

The first fluid can serve as a heat transfer fluid. The first fluid can be, for example, water, ethylene glycol, ethylene glycol-water mixtures, propylene glycol, propylene glycol-water mixtures, a paraffin oil, a mineral oil, hydrogenated mineral oil, a synthetic hydrocarbon oil, an alkylated aromatic oil, a hydrogenated terphenyl, a silicone oil, a polydimethylsiloxane, a diphenylsiloxane dimethylsiloxane copolymer, a diphenyl ether, a polyphenylene ether, or a mixture comprising at least one of the foregoing. In some embodiments, the first fluid is water, for example the water effluent from a fossil-fuel or nuclear power plant.

The second fluid can be a refrigerant. In some embodiments, the first fluid is an organic compound. The second fluid can be a methane derivative, an ethane derivative, a propane derivative, a butane derivative, or another type of organic compound. The second fluid can be, for example, trichlorofluoromethane, dichlorodifluoromethane, bromochlorodifluormethane, chlorotrifluoromethane, bromotrifluoromethane, triifluoroiodomethane, tetrachloromethane (carbon tetrachloride), dichlorofluoromethane, chlorodifluoromethane, trifluoromethane, dichloromethane (methylene chloride), chlorofluoromethane, difluoromethane (methylene fluoride), chloromethane (methyl chloride), fluoromethane (methyl fluoride), methane, 1,1,2-trichloro-1,2,2-trifluoroethane, 1,2-dichloro-1,1,2,2-tetrafluoromethane, chloropentafluoroethane, hexafluoroethane, 2,2-dichloro-1, 1,1-trifluoroethane, 2-chloro-1,1,1,2-tetrafluoroethane, pentafluoroethane, 1,2,2,3,3-pentafluorobutane (HFC-365mfc), 1,1,1,2-tetrafluoroethane, 1,1-dichloro-1-fluoroethane, 1-chloro-1,1-difluoroethane, 1,1,1-trifluoroethane, 1,1-difluoroethane, ethane, propane, butane, pentane, 2-methylpropane (isobutane), 2-methylbutane (isopentane), octafluorocyclobutane, methoxymethane, ethoxyethane, methyl formate, methanamine (methyl amine), ethanamine (ethyl amine), trans-1,2-dichloroethene, 1,1-difluoroethylene, trans-1,2-difluoroethene, ethene (ethylene), 1-chloro-2,3,3, 3-tetrafluoropropene, trans-1-chloro-3,3,3-trifluoro-1-propene, 2,3,3,3-tetrafluoro-1-propene, trans-1,3,3,3-tetrafluoro-1-propene, propene (propylene), trans-1,1,1,4,4,4-hexafluoro-2-butene, cis-1,1,1,4,4,4-hexaflouro-2-butene, trans-1,2-dichloroethene, 1,1,2,2-tetrafluoroethyl 2,2,2-trifluoroethyl ether (HFE-347pfc), trans-1-chloro-3,3,3-trifluoropropene (HFO-1233zd), or a mixture comprising at least one of the foregoing.

In some embodiments, the second fluid is an inorganic compound. The first fluid can be, for example, hydrogen, helium, ammonia, neon, nitrogen, oxygen, argon, carbon dioxide, nitrous oxide, sulfur dioxide, or a mixture comprising at least one of the foregoing.

Mixtures of first fluids, mixtures of second fluids, or mixtures of first fluids and mixtures of second fluids can also be used. Depending on the composition, the first fluid and second fluid can form an azeotropic mixture.

In some embodiments, the first fluid is an organic compound having a boiling point in the range of −20° C. to 40° C. In some embodiments, the second fluid is trans-1,2-dichloroethene, 1,1,2,2-tetrafluoroethyl 2,2,2-trifluoroethyl ether (HFE-347pfc), trans-1-chloro-3,3,3-trifluoropropene (HFO-1233zd), or carbon dioxide. The first fluid is heated by a waste heat source. The waste heat can be a by-product of many industrial processes, for example metal manufacturing, e.g. steel mills, nonmetallic mineral manufacturing, e.g. calcining to produce cement, gypsum, alumina, soda ash, lime, or kaolin clay, petroleum refining, chemical manufacturing, metal fabrication, natural gas compressor stations, landfill gas energy systems, and oil and gas production, to name a few heat sources. The system is especially suitable for lower temperature heat sources, such as fossil fuel power generation effluent, nuclear power generation effluent, biomass power generation, geothermal heat, solar ponds, and wind energy to name a few examples.

The following embodiments are set forth as representative. These embodiments are not to be construed as limiting the scope of the invention as these and other equivalent embodiments will be apparent in view of the present disclosure and appended claims.

Figure 2:
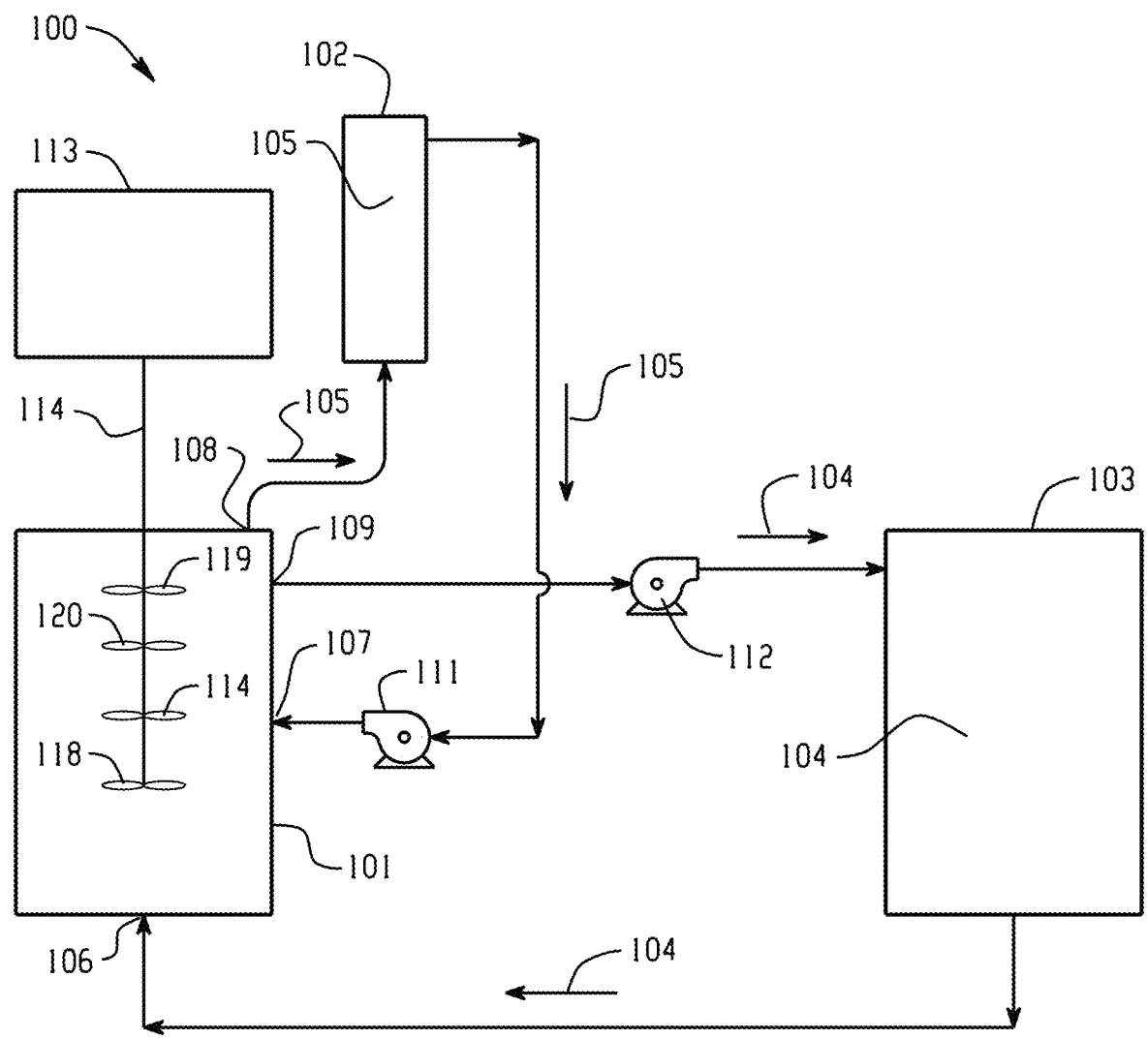
FIG. 2 is a schematic diagram of system 100.

FIG. 2 is a schematic diagram of an embodiment of a power generation system 100. System 100 comprises a heat source 103 which serves to heat first fluid 104 to a temperature $T_1$ and pressure $P_1$. The first fluid 104 enters the turbine via first fluid inlet 106. System 100 also comprises a second fluid 105 at a temperature $T_4$ and pressure $P_4$. In some embodiments, the second fluid is obtained from condensation of gaseous second fluid in condenser 102. The second fluid 105 is simultaneously pumped into the turbine 101 by means of second pump 111 and second fluid inlet 107. The second fluid is selected so that its boiling point Tb is below the temperature of the first fluid $T_1$ and the temperature of the second fluid $T_4$ is below $T_1$. $T_1$ can be, for example, above Tb. The first fluid and second fluid are mixed in the turbine 101 to form a mixture, wherein the first fluid heats the second fluid to temperature $T_2$ above Tb, resulting in vaporization of the second fluid. Vaporization of the second fluid pressurizes the mixture, and the pressurized mixture drives the turbine. The fluid mixture exits the turbine rotors at temperature $T_3$ and pressure $P_3$. In some embodiments, the first fluid and second fluid are immiscible and the vaporized second fluid separates from the first fluid. The first fluid exits the turbine 101 via first fluid outlet 109 and the second fluid exits the turbine 101 via second fluid outlet 108. In some embodiments, the vaporized second fluid is liquified in condenser 102 and the liquified second fluid is returned to the turbine 101 via second fluid inlet 107. In some embodiments, the first fluid 104 is reheated to $T_1$ and $P_1$ by heat source 103 and the cycle described above is repeated in a continuous process. In some embodiments, the first fluid 104 is returned to the heat source via optional pump 112. In some embodiments, pump 112 is not needed. Shaft 114 is configured to be in communication with a power generation unit 113 so that its rotational energy is converted to electricity. The shaft is configured to rotate a plurality of rotors. The rotors on the shaft can include a first rotor 118 and a second rotor 119, wherein the first rotor 118 is upstream of the second fluid inlet 107 and the second rotor 119 is downstream of the second fluid inlet 107. As shown in FIG. 2, the plurality of rotors can further comprise a third rotor 120 that is configured to oppose the flow of mixture of first fluid 104 and second fluid 105. In some embodiments, third rotor 120 is provided in an opposite directionality as the first rotor 118 and the second rotor 119. The third rotor 120 can be downstream of the first rotor 118 and the second fluid inlet 107 and upstream of the second rotor 119. As discussed above, the pressurization of the fluid mixture comprising the first fluid and second fluid by vaporization of the second fluid drives the rotation of the rotor assembly and shaft 114.

Figure 3:
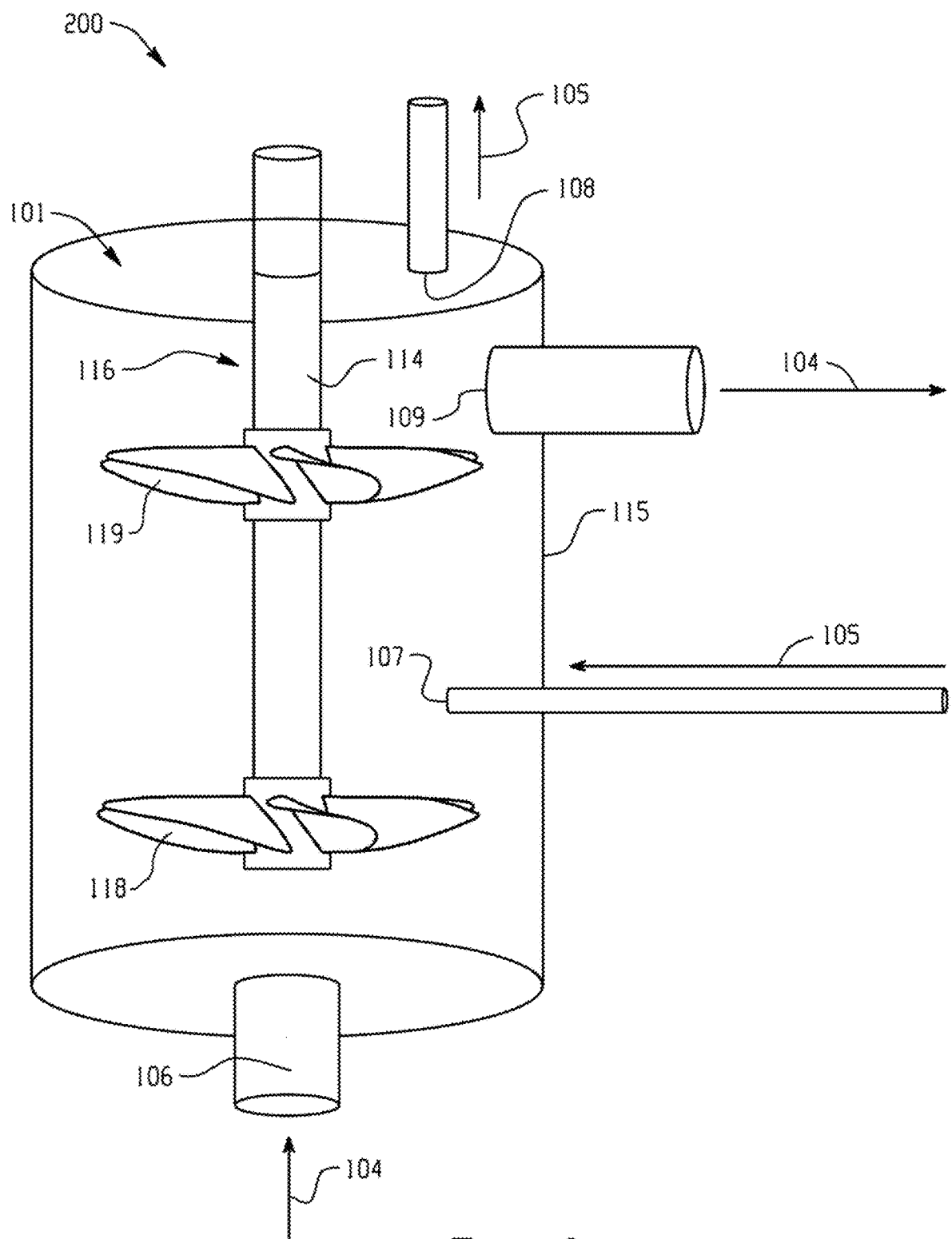
FIG. 3 is a schematic diagram of system 200.

FIG. 3 is a schematic diagram of an embodiment of a system 200, which includes turbine 101, first fluid 104 and second fluid 105. Turbine 101 comprises a rotor assembly 116 and casing 115 for containment of the first fluid 104 and second fluid 105. Rotor assembly 116 comprises shaft 114, first rotor 118, and second rotor 119. Turbine 101 also comprises fluid inlets and fluid outlets for the first fluid and second fluid, and in particular, first fluid inlet 106, first fluid outlet 109, second fluid inlet 107, and second fluid outlet 108. In some embodiments, the rotor assembly 116 can comprise a plurality of rotors. For example, the at least one first rotor can comprise 1 to 500 first rotors, the at least one second rotor can comprise 1 to 500 second rotors, and an at least one third rotor (not shown in FIG. 3) can comprise 1 to 500 third rotors. For illustration purposes, the rotor assembly 116 can comprise three first rotors, two second rotors, and one third rotor.

The first fluid 104 enters turbine 101 at a temperature $T_1$ and pressure $P_1$ by means of first fluid inlet 106. The second fluid 105 enters the turbine 101 at a temperature $T_4$ and pressure $P_4$ by means of second fluid inlet 107. The second fluid 105 is selected so that its boiling point Tb is below the temperature of the first fluid $T_1$ and the temperature of the second fluid $T_4$ is below $T_1$. $T_1$ can be, for example, above Tb. The first fluid 104 and second fluid 105 are mixed in the turbine 101 by means of rotor assembly 116 to form a fluid mixture, wherein the first fluid heats the second fluid to temperature $T_2$ above Tb, resulting in vaporization of the second fluid. Vaporization of the second fluid pressurizes the fluid mixture, and the pressurized fluid mixture drives the turbine. The fluid mixture exits the turbine at temperature $T_3$ and pressure $P_3$. In some embodiments, the first fluid and second fluid are immiscible and the vaporized second fluid separates from the first fluid. The first fluid exits the turbine 101 via second fluid outlet 109 and the second fluid exits the turbine 101 via first fluid outlet 108. In some embodiments, the vaporized second fluid is liquified in a condenser and the liquified second fluid is returned to the turbine 101 by means of second fluid inlet 107, and the first fluid is reheated by a heat source and returned to the turbine 101 by means of first fluid inlet 106, thus providing a continuous process.

In a related embodiment, the turbine is also vertically orientated, and the first fluid enters the turbine from the bottom. The first fluid is water, in particular, warm water effluent from a power generation plant, which enters the turbine at a temperature above 40° C. and a flow rate of about 20 gal/min. The turbine is configured such that the second fluid enters perpendicularly to the flow of the first fluid, somewhere between the bottom and the top of the turbine. The second fluid is pentane, which has a boiling point of 35.9 to 36.3° C. enters the turbine at a temperature of about 20° C. and a flow rate of about 4 gal/min. The pentane mixes with, and is heated by, the flow of warm water to a temperature above its boiling point such that the pentane vaporizes in the turbine. The flow of water, the vaporization of the pentane, and back-pressure from the first and second rotors and the turbine casing provide a fluid pressure of about 40 atm. Flow of the fluid mixture through the second rotor of the turbine imparts rotational energy to the rotor assembly. The rotational energy of the rotor assembly is converted to electricity by generators well known in the art. The fluid mixture exits the turbine from the top at temperature at a flow rate of about 20 gal/min under steady state conditions.

Figure 4:
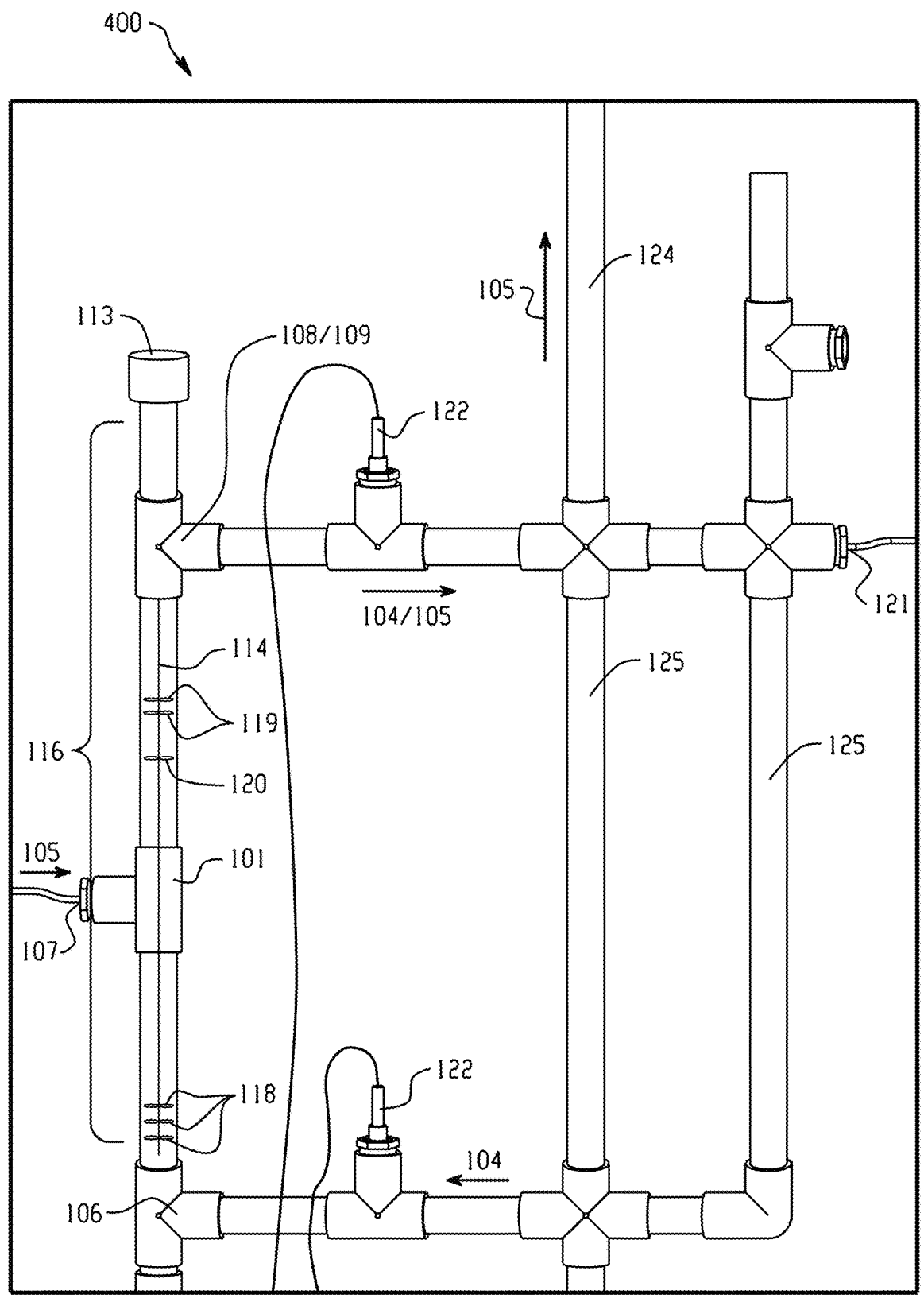
FIG. 4 is a photograph of system 400.

An illustrative embodiment of the system is depicted in FIG. 4. The system 400 comprises a vertical rotor assembly 116. The first fluid 104 is directed to first fluid inlet 106 from at least one of conduits 125. For demonstration purposes, the first fluid 104 is heated in at least one of conduits 125 with a heating element (not visible). The second fluid outlet 108 and the first fluid outlet 109 are combined downstream of the rotors. Sensors 122 are provided to measure temperature of the heated first fluid 104 as it enters the turbine 101 at the first fluid inlet 106 and the temperature of the first fluid 104 and the second fluid 105 as the mixture exits the turbine 101 at outlet 108/109. The second fluid 105 enters at fluid inlet 107. As the first fluid 104 mixes with the second fluid 105, the second fluid 105 undergoes a phase change to a gas phase. The gaseous second fluid 105 can exit the system 400 via fluid outlet 109 to conduit 124 to a condenser 102 (not shown) where the second fluid 105 is liquefied. The second fluid outlet 108 and the first fluid outlet 109 are combined downstream of the rotors, i.e. the first fluid 104 can also exit system 400 via fluid outlet 108, (which is the same as fluid outlet 109 for the second fluid 105). The combined outlet for first fluid 104 and second fluid 105 are denoted as 108/109 in the photograph. An overflow outlet 121 can provide an outlet for excess of first fluid 104.

Rotor assembly 116 comprises shaft 114, which is configured with a plurality of rotors. The rotors on the shaft includes first rotors 118 and second rotors 119, wherein the first rotors 118 are upstream of the second fluid inlet 107 and the second rotors 119 are downstream of the second fluid inlet 107. As shown in FIG. 4, the plurality of rotors can further comprise a third rotor 120 that is configured to oppose the flow of mixture of first fluid 104 and second fluid 105. In some embodiments, third rotor 120 is provided in an opposite directionality as the first rotors 118 and the second rotors 119. The third rotor 120 can be downstream of the first rotors 118 and the second fluid inlet 107 and upstream of the second rotors 119. As discussed above, the pressurization of the fluid mixture comprising the first fluid and second fluid by vaporization of the second fluid drives the rotation of the rotor assembly and shaft 114.

Figure 5:
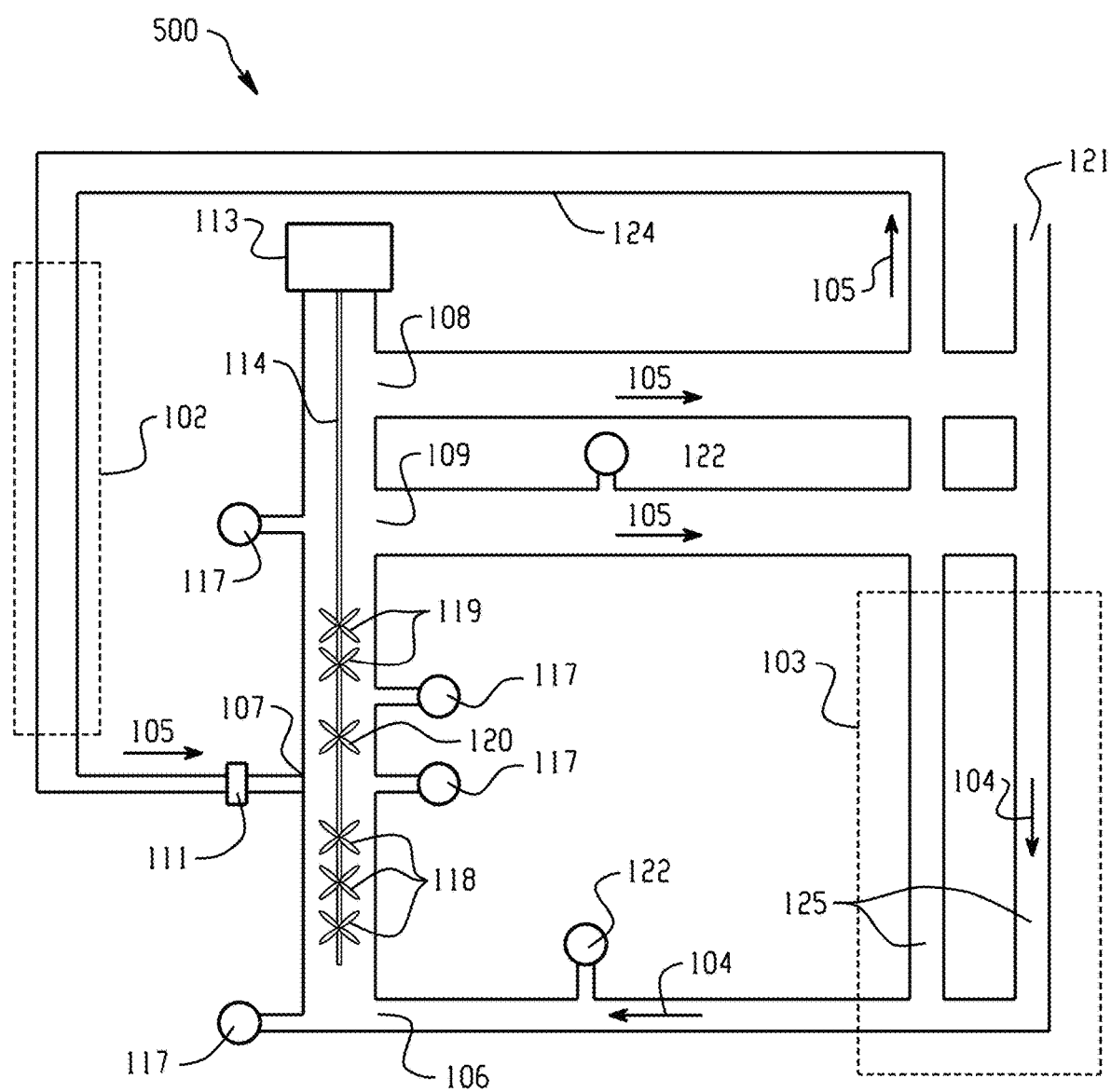
FIG. 5 is a schematic diagram of system 500.

FIG. 5 is a schematic diagram of system 500, which is partially based on the photograph of system 400 provided in FIG. 4. The system 500 comprises a vertical rotor assembly. The first fluid 104 enters the system at first fluid system inlet 121 and is directed to first fluid turbine inlet 106 via at least one of conduits 125. For demonstration purposes, the first fluid 104 is heated in at least one of conduits 125 with a heating element (103). First fluid 104 and second fluid 105 are mixed in the inner space of the turbine 101 downstream of the at least one first rotor 118 and upstream of the at least one second rotor 119. After passing downstream of the at least one second rotor 119, the mixture may separate into the first fluid 104 as a liquid and the second fluid 105 as a gas in the turbine downstream of the at least one second rotors 119. The first fluid outlet 109 and the second fluid outlet 108 are downstream of the at least one second rotor 119. If the separation of first fluid and second fluid occurs in the turbine, the first fluid 104 in the liquid state may exit through first fluid outlet 109. The separated first fluid 104 in the liquid state can travel through at least one of conduits 125 for recycling back to the turbine. If the separation of first fluid and second fluid occurs in the turbine, the second fluid 105 in the liquid state may exit through second fluid outlet 108. The separated second fluid 105 in the gaseous state can exit the system as a gas via conduit 124 for recycling back to the turbine. Conduit 124 can conduct second fluid 105 in the gaseous state to condenser 102, where it is condensed back to the liquid state and recycled to turbine 101 via second fluid inlet 107. System 500 includes pump 111 to direct the second fluid 105 into the turbine 101 via second fluid inlet 107. The pump can be a bellow pump, a diaphragm pump, a peristaltic pump, a scroll pump or a gear pump. The second fluid 105 can also be directed to the turbine by means of the Venturi effect, for example with a Venturi tube or an orifice plate.

System 500 also includes temperature sensors 122 and pressure sensors 117 to measure the temperature and pressure, respectively, at various locations in the system. The measured temperature and pressure can be used for system monitoring.

Figure 6:
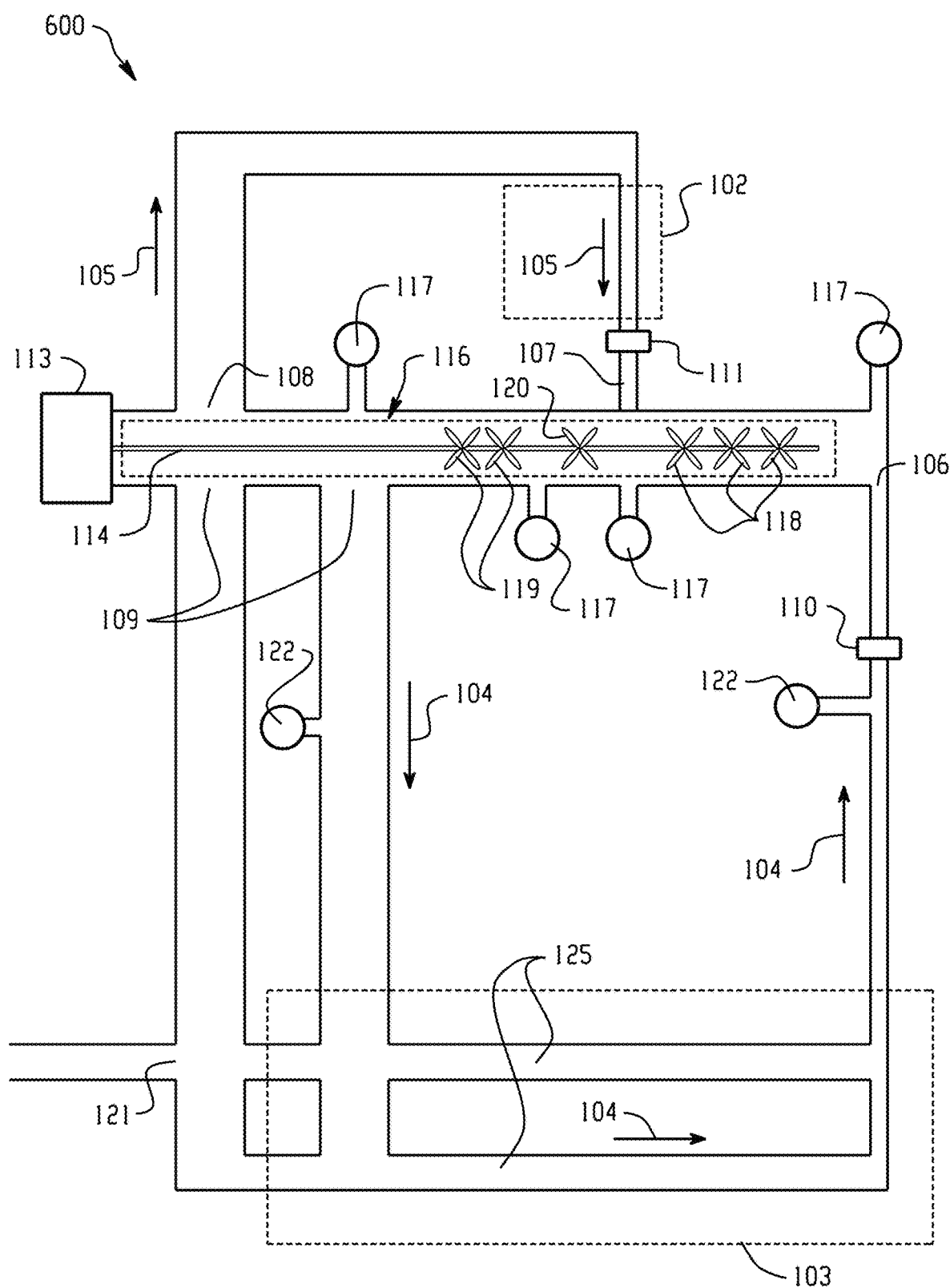
FIG. 6 is a schematic diagram of system 600.

FIG. 6 is a schematic diagram of an embodiment of system 600, which features a horizontal rotor assembly 116 as opposed to the vertical rotor assembly of system 500 depicted schematically in FIG. 5. Aside from the horizontal orientation of system 600, it is otherwise similar to system 500 of FIG. 5 so that the description of system 500 above is generally applicable to system 600 as well.

The present disclosure includes the following numbered embodiments. The embodiments are numbered and refer to other embodiments by number, thus explicitly making logical connections between the embodiments. When a particular feature, structure, or characteristic is described in connection with an embodiment, it is within the ability of one skilled in the art to include such feature, structure, or characteristic in connection with other embodiments whether or not such combination is explicitly described elsewhere in the disclosure.

Embodiment 1. A system comprising: a turbine; a first fluid; and a second fluid, wherein the turbine comprises
  a. a rotor assembly comprising at least one first rotor and at least one second rotor affixed to a shaft and within an enclosure configured to contain the first fluid and the second fluid, wherein the at least one second rotor is positioned on the shaft downstream of the at least one first rotor, the at least one first rotor is configured to draw the first fluid into the turbine, the at least one second rotor is configured to extract energy from a mixture of the first fluid and the second fluid by contacting the mixture and providing rotational energy to the rotor assembly, and the at least one first rotor and at least one second rotor are also configured to mix the second fluid with the first fluid to form the mixture,
  b. a first fluid inlet positioned upstream of the at least one first rotor,
  c. a second fluid inlet positioned between the at least one first rotor and the at least one second rotor and configured to direct the second fluid into the turbine,
  d. a fluid outlet positioned downstream of the at least one second rotor, and
  e. a gas outlet positioned downstream of the at least one second rotor,
  wherein the energy in the mixture provided to the at least one second rotor results from vaporization and expansion of the second fluid resulting in pressurization of the mixture.

Embodiment 2. The system of embodiment 1, wherein the rotor assembly is vertically orientated.

Embodiment 3. The system of embodiment 1, wherein the rotor assembly is horizontally orientated.

Embodiment 4. The system of any of embodiments 1 to 3, further comprising a condenser configured to condense vapor of the second fluid downstream of the turbine and recycling the condensed second fluid.

Embodiment 5. The system of any of embodiments 1 to 4, wherein the rotor assembly further comprises at least one third rotor configured to oppose the flow of the mixture and to compress a second fluid vapor phase of the mixture, wherein the at least one third rotor is positioned between the at least one first rotor and the at least one second rotor.

Embodiment 6. The system of embodiment 5, wherein the at least one third rotor has the opposite directionality of the at least one first and second rotors.

Embodiment 7. The system of any of embodiments 1 to 6, wherein the gas outlet is positioned after the fluid outlet in the direction of fluid flow.

Embodiment 8. The system of embodiment 5 or embodiment 6, wherein the at least one first rotor comprises 1 to 500 first rotors, the at least one second rotor comprises 1 to 500 second rotors, and the at least one third rotor comprises 1 to 500 third rotors.

Embodiment 9. The system of any of embodiments 5, 6, or 8, wherein the at least one first, second, and third rotors are each independently at least one of an axial rotor, a radial rotor, a screw rotor, a Francis rotor, a Kaplan rotor, or a Tesla rotor.

Embodiment 10. The system of any of embodiments 1 to 9, wherein the first fluid is a heat transfer fluid.

Embodiment 11. The system of embodiment 10, wherein the first fluid is at least one of water, ethylene glycol, ethylene glycol-water mixtures, propylene glycol, propylene glycol-water mixtures, a paraffin oil, a mineral oil, hydrogenated mineral oil, a synthetic hydrocarbon oil, an alkylated aromatic oil, a hydrogenated terphenyl, a silicone oil, a polydimethylsiloxane, a diphenylsiloxane-dimethylsiloxane copolymer, a diphenyl ether, or a polyphenylene ether.

Embodiment 12. The system of any of embodiments 1 to 11, wherein the second fluid is at least one of trichlorofluoromethane, dichlorodifluoromethane, bromochlorodifluormethane, chlorotrifluoromethane, bromotrifluoromethane, triifluoroiodomethane, tetrachloromethane (carbon tetrachloride), dichlorofluoromethane, chlorodifluoromethane, trifluoromethane, dichloromethane (methylene chloride), chlorofluoromethane, difluoromethane (methylene fluoride), chloromethane (methyl chloride), fluoromethane (methyl fluoride), methane, 1,1,2-trichloro-1,2,2-trifluoroethane, 1,2-dichloro-1,1,2,2-tetrafluoromethane, chloropentafluoroethane, hexafluoroethane, 2,2-dichloro-1,1,1-trifluoroethane, 2-chloro-1,1,1,2-tetrafluoroethane, pentafluoroethane, 1,2,2,3,3-pentafluorobutane (HFC-365mfc), 1,1,1,2-tetrafluoroethane, 1,1-dichloro-1-fluoroethane, 1-chloro-1,1-difluoroethane, 1,1,1-trifluoroethane, 1,1-difluoroethane, ethane, propane, butane, pentane, 2-methylpropane (isobutane), 2-methylbutane (isopentane), octafluorocyclobutane, methoxymethane, ethoxyethane, methyl formate, methanamine (methyl amine), ethanamine (ethyl amine), trans-1,2-dichloroethene, 1,1-difluoroethylene, trans-1,2-difluoroethene, ethene (ethylene), 1-chloro-2,3,3,3-tetrafluoropropene, trans-1-chloro-3,3,3-trifluoro-1-propene, 2,3,3,3-tetrafluoro-1-propene, trans-1,3,3,3-tetrafluoro-1-propene, propene (propylene), trans-1,1,1,4,4,4-hexafluoro-2-butene, or cis-1,1,1,4,4,4-hexaflouro-2-butene, trans-1,2-dichloroethene, 1,1,2,2-tetrafluoroethyl 2,2,2-trifluoroethyl ether (HFE-347pfc), trans-1-chloro-3,3, 3-trifluoropropene (HFO-1233zd), hydrogen, helium, ammonia, neon, nitrogen, oxygen, argon, carbon dioxide, nitrous oxide, or sulfur dioxide.

Embodiment 13. A power generation system comprising: the system of any of embodiments 1 to 12 and an electrical power generator driven by the turbine.

Embodiment 14. A continuous process for converting heat to kinetic energy utilizing the system of any of embodiments 1 to 13, wherein the heat is extracted from the first fluid and converted to rotational motion, comprising the following simultaneous steps:
  a. drawing the first fluid into the turbine through the first fluid inlet and imparting flow downstream of the first fluid by rotation of the at least one first rotor;
  b. pumping a second fluid into the second fluid inlet;
  c. mixing the second fluid with the first fluid to form a mixture of first fluid and second fluid;
  d. vaporization of the second fluid by heat transfer from the first fluid to form a pressurized mixture; and
  e. contacting the at least one second rotor with the pressurized mixture to impart rotational motion to the rotor assembly by means of mixture flow through the at least one second rotor.

Embodiment 15. The process of embodiment 14, wherein the first fluid is water having a temperature of 30° C. to 100° C.

Embodiment 16. The process of embodiment 14 or embodiment 15, wherein the second fluid has a boiling point of −20° C. to 60° C.

Embodiment 17. The process of any of embodiments 14 to 16, wherein the first fluid is water, and the second fluid has a boiling point of −20° C. to 40° C.

Embodiment 18. The process of any of embodiments 14 to 17, wherein the first fluid and second fluid are miscible.

Embodiment 19. The process of any of embodiments 14 to 17, wherein the first fluid and second fluid are not miscible.

Embodiment 20. The process of any of embodiments 14 to 19, wherein the first fluid and second fluid of the mixture are both in the liquid phase.

Embodiment 21. The process of any of embodiments 14 to 19, wherein the first fluid of the mixture is in the liquid phase and the second fluid of the mixture is in the vapor phase.

Embodiment 22. The process of any of embodiments 14 to 21, wherein the mixture exits the turbine as a liquid solution or a liquid with entrained vapor.

Embodiment 23. The process of any of embodiments 14 to 22, wherein mixing of the first fluid and the second fluid occurs between the at least one first rotor and the at least one second rotor.

Embodiment 24. The process of any of embodiments 14 to 23, wherein the rotor assembly further comprises at least one third rotor configured to oppose the flow of the mixture and to compress a second fluid vapor phase of the mixture, wherein the at least one third rotor is positioned between the at least one first rotor and the at least one second rotor.

Embodiment 25. The process of embodiment 24, wherein the least one third rotor has the opposite directionality of the at least one first and second rotors.

Embodiment 26. The process of any of embodiments 14 to 25, wherein: the first fluid in the turbine upstream of the at least one first rotor is at a first temperature $T_1$ and first pressure $P_1$; the mixture in the turbine downstream of the at least one first rotor and upstream of the at least one second rotor is at a second temperature $T_2$ and second pressure $P_2$; and the mixture in the turbine upstream of the at least one second rotor is at a third temperature $T_3$ and third pressure $P_3$, wherein $T_1$ is 40 to 500° C.; $T_2$ is 40 to 400° C.; $T_3$ is 20 to 100° C.; $P_1$ is 0 to 10 atm; $P_2$ is 1 to 40 atm; and $P_3$ is 0 to 3 atm.

Embodiment 27. The process of embodiment 26, wherein: $T_1 > T_2 > T_3$; and $P_2 > P_3 \geq P_1$.

It will be appreciated by those skilled in the art that various changes and modifications can be made to the illustrated embodiments without departing from the spirit of the present invention. All such modifications and changes are intended to be within the scope of the present invention except as limited by the scope of the appended claims.

As used herein, "a", "an", and "the" refer to both singular and plural referents unless the context clearly dictates otherwise.

The terms "about", "substantially", "approximately", "circa", and variations thereof are intended to include the degree of error associated with measurement of the particular quantity based upon the equipment available at the time of filing the application. For example, "about" a given value can include a range of ±15% or less, ±10% or less, ±5% or less, or ±1% or less, of the given value. The value to which the modifier "about" refers is itself specifically disclosed herein.

As used herein, comparative terms, such as "high", "low", "strong", "weak", "more", "less", "longer", "ultralong", "shorter", and the like, are used for ease of description to describe one element or feature's relationship to another element(s) or feature(s).

The following definitions are to be used for the interpretation of the claims and specification. As used herein, the terms "comprises", "comprising", "includes", "including", "has", "having", "contains", "containing", or any other variation thereof, are intended to be non-exclusive. In other words, a composition, process, method, system, or article that comprises a list of elements is not necessarily limited to only those elements but can include other elements not expressly listed or inherent in such composition, process, method, system, or article. Additionally, the terms "exemplary" and "example" are used herein to mean "serving as an example, instance or illustration." Any embodiment described herein as "exemplary" is not necessarily to be construed as preferred or advantageous over other embodiments. The terms "at least one" and "one or more" are understood to include any integral number greater than or equal to one, i.e. one, two, three, four, etc. The term "a plurality" are understood to include any integral number greater than or equal to two, i.e. two, three, four, five, etc. "At least one of" as used herein in connection with a list means that the list is inclusive of each element individually, as well as combinations of two or more elements of the list, and combinations of at least one element of the list with like elements not named.

References to numerical ranges with lower and upper endpoints herein include all numbers subsumed within the range (including fractions), whether explicitly recited or not, as well as the endpoints of the range. Thus, "1 to 5" includes 1, 2, 3, 4, and 5 when referring to, for example, a number of elements, and can also include 1.5, 2, 2.75, 3.8, or any other decimal amount when referring to, for example, quantitative measurements.

All method steps described herein can be performed in any suitable order unless otherwise indicated herein or otherwise clearly contradicted by context.

The use of any and all examples, or exemplary language (e.g., "such as" or "for example"), is intended merely to better illustrate an embodiment and does not represent a limitation on the scope of the invention or any embodiments unless indicated otherwise by context.

Any combination or permutation of features, functions and/or embodiments disclosed herein is likewise considered herein disclosed. Additional features, functions, or applications of the compositions, methods, and systems, disclosed herein will be apparent from the disclosure, particularly when read in conjunction with the appended figures. Any references listed in this disclosure are hereby incorporated by reference in their entireties.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

What is claimed is:

1. A system comprising:
   a turbine;
   a first fluid; and
   a second fluid, wherein the turbine comprises
   a. a rotor assembly comprising at least one first rotor and at least one second rotor affixed to a shaft and within an enclosure configured to contain the first fluid and the second fluid, wherein
      the at least one second rotor is positioned on the shaft downstream of the at least one first rotor,
      the at least one first rotor is configured to draw the first fluid into the turbine, the at least one second rotor is configured to extract energy from a mixture of the first fluid and the second fluid by contacting the mixture and providing rotational energy to the rotor assembly, and
      the at least one first rotor and at least one second rotor are also configured to mix the second fluid with the first fluid to form the mixture,
   b. a first fluid inlet positioned upstream of the at least one first rotor,
   c. a second fluid inlet positioned between the at least one first rotor and the at least one second rotor and configured to direct the second fluid into the turbine,
   d. a fluid outlet positioned downstream of the at least one second rotor, and
   e. a gas outlet positioned downstream of the at least one second rotor,
   wherein the energy in the mixture provided to the at least one second rotor results from vaporization and expansion of the second fluid resulting in pressurization of the mixture.

2. The system of claim 1, wherein the rotor assembly is vertically orientated.

3. The system of claim 1, wherein the rotor assembly is horizontally orientated.

4. The system of claim 1, further comprising a condenser configured to condense vapor of the second fluid downstream of the turbine and recycling the condensed second fluid.

5. The system of claim 1, wherein the rotor assembly further comprises at least one third rotor configured to oppose the flow of the mixture and to compress a second fluid vapor phase of the mixture, wherein the at least one third rotor is positioned between the at least one first rotor and the at least one second rotor.

6. The system of claim 5, wherein the at least one third rotor has the opposite directionality of the at least one first and second rotors.

7. The system of claim 5, wherein the at least one first rotor comprises 1 to 500 first rotors, the at least one second rotor comprises 1 to 500 second rotors, and the at least one third rotor comprises 1 to 500 third rotors.

8. The system of claim 5, wherein the at least one first, second, and third rotors are each independently at least one of an axial rotor, a radial rotor, a screw rotor, a Francis rotor, a Kaplan rotor, or a Tesla rotor.

9. The system of claim 1, wherein the gas outlet is positioned after the fluid outlet in the direction of fluid flow.

10. The system of claim 1, wherein the first fluid is a heat transfer fluid.

11. The system of claim 10, wherein the first fluid is at least one of water, ethylene glycol, ethylene glycol-water mixtures, propylene glycol, propylene glycol-water mixtures, a paraffin oil, a mineral oil, hydrogenated mineral oil, a synthetic hydrocarbon oil, an alkylated aromatic oil, a hydrogenated terphenyl, a silicone oil, a polydimethylsiloxane, a diphenylsiloxane-dimethylsiloxane copolymer, a diphenyl ether, or a polyphenylene ether.

12. The system of claim 1, wherein the second fluid is at least one of trichlorofluoromethane, dichlorodifluoromethane, bromochlorodifluormethane, chlorotrifluoromethane, bromotrifluoromethane, triifluoroiodomethane, tetrachloromethane (carbon tetrachloride), dichlorofluoromethane, chlorodifluoromethane, trifluoromethane, dichloromethane (methylene chloride), chlorofluoromethane, difluoromethane (methylene fluoride), chloromethane (methyl chloride), fluoromethane (methyl fluoride), methane, 1,1,2-trichloro-1,2,2-trifluoroethane, 1,2-dichloro-1,1,2,2-tetrafluoromethane, chloropentafluoroethane, hexafluoroethane, 2,2-dichloro-1,1,1-trifluoroethane, 2-chloro-1,1,1,2-tetrafluoroethane, pentafluoroethane, 1,2,2,3,3-pentafluorobutane (HFC-365mfc), 1,1,1,2-tetrafluoroethane, 1,1-dichloro-1-fluoroethane, 1-chloro-1,1-difluoroethane, 1,1,1-trifluoroethane, 1,1-difluoroethane, ethane, propane, butane, pentane, 2-methylpropane (isobutane), 2-methylbutane (isopentane), octafluorocyclobutane, methoxymethane, ethoxyethane, methyl formate, methanamine (methyl amine), ethanamine (ethyl amine), trans-1,2-dichloroethene, 1,1-difluoroethylene, trans-1,2-difluoroethene, ethene (ethylene), 1-chloro-2,3,3,3-tetrafluoropropene, trans-1-chloro-3,3,3-trifluoro-1-propene, 2,3,3,3-tetrafluoro-1-propene, trans-1,3,3,3-tetrafluoro-1-propene, propene (propylene), trans-1,1,1,4,4,4-hexafluoro-2-butene, cis-1,1,1,4,4,4-hexaflouro-2-butene, trans-1,2-dichloroethene, 1,1,2,2-tetrafluoroethyl 2,2,2-trifluoroethyl ether (HFE-347pfc), or trans-1-chloro-3,3,3-trifluoropropene (HFO-1233zd), ammonia, carbon dioxide, or sulfur dioxide.

13. A power generation system comprising: the system of claim 1 and an electrical power generator driven by the turbine.

14. A continuous process for converting heat to kinetic energy utilizing the system of claim 1, wherein the heat is extracted from the first fluid and converted to rotational motion, comprising the following simultaneous steps:
   a. drawing the first fluid into the turbine through the first fluid inlet and imparting flow downstream of the first fluid by rotation of the at least one first rotor;
   b. pumping a second fluid into the second fluid inlet;
   c. mixing the second fluid with the first fluid to form a mixture of first fluid and second fluid;
   d. vaporization of the second fluid by heat transfer from the first fluid to form a pressurized mixture; and e. contacting the at least one second rotor with the pressurized mixture to impart rotational motion to the rotor assembly by means of mixture flow through the at least one second rotor.

15. The process of claim 14, wherein the first fluid is water having a temperature of 30° C. to 100° C.

16. The process of claim 15, wherein the second fluid has a boiling point of −20° C. to 60° C.

17. The process of claim 14, wherein the first fluid is water, and the second fluid has a boiling point of −20° C. to 40° C.

18. The process of claim 14, wherein the first fluid and second fluid are miscible.

19. The process of claim 14, wherein the first fluid and second fluid are not miscible.

20. The process of claim 14, wherein the first fluid and second fluid of the mixture are both in the liquid phase.

21. The process of claim 14, wherein the first fluid of the mixture is in the liquid phase and the second fluid of the mixture is in the vapor phase.

22. The process of claim 14, wherein the mixture exits the turbine as a liquid solution or a liquid with entrained vapor.

23. The process of claim 14, wherein mixing of the first fluid and the second fluid occurs between the at least one first rotor and the at least one second rotor.

24. The process of claim 14, wherein the rotor assembly further comprises at least one third rotor configured to oppose the flow of the mixture and to compress a second fluid vapor phase of the mixture, wherein the at least one third rotor is positioned between the at least one first rotor and the at least one second rotor.

25. The process of claim 24, wherein the least one third rotor has the opposite directionality of the at least one first and second rotors.

26. The process of claim 14, wherein:

the first fluid in the turbine upstream of the at least one first rotor is at a first temperature $T_1$ and first pressure $P_1$;

the mixture in the turbine downstream of the at least one first rotor and upstream of the at least one second rotor is at a second temperature $T_2$ and second pressure $P_2$; and the mixture in the turbine upstream of the at least one second rotor is at a third temperature $T_3$ and third pressure $P_3$, wherein $T_1$ is 40 to 500° C.;
$T_2$ is 40 to 400° C.;
$T_3$ is 20 to 100° C.;
$P_1$ is 0 to 10 atm;
$P_2$ is 1 to 40 atm; and
$P_3$ is 0 to 3 atm.

27. The process of claim 26, wherein:
$T_1 > T_2 > T_3$; and
$P_2 > P_3 \geq P_1$.

* * * * *